United States Patent
Nakazawa et al.

(10) Patent No.: US 7,661,786 B2
(45) Date of Patent: Feb. 16, 2010

(54) INK JET RECORDING APPARATUS AND INK JET RECORDING METHOD

(75) Inventors: Koichiro Nakazawa, Machida (JP); Takuei Ishikawa, Tokyo (JP); Katsuhiro Shirota, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 279 days.

(21) Appl. No.: 11/099,442

(22) Filed: Apr. 6, 2005

(65) Prior Publication Data

US 2005/0219294 A1    Oct. 6, 2005

(30) Foreign Application Priority Data

Apr. 6, 2004    (JP)    ............... 2004-112213

(51) Int. Cl.
    *B41J 29/38*    (2006.01)
(52) U.S. Cl. ............................ 347/14; 347/5; 347/16
(58) Field of Classification Search ............ 347/19, 347/101, 16
    See application file for complete search history.

(56) References Cited

U.S. PATENT DOCUMENTS

| 4,313,124 | A | 1/1982 | Hara ................. 349/140 R |
| 4,345,262 | A | 8/1982 | Shirato et al. ......... 346/140 R |
| 4,459,600 | A | 7/1984 | Sato et al. ............ 346/140 R |
| 4,463,359 | A | 7/1984 | Ayata et al. ............. 346/1.1 |
| 4,558,333 | A | 12/1985 | Sugitani et al. ........ 346/140 R |
| 4,723,129 | A | 2/1988 | Endo et al. .............. 346/1.1 |
| 4,740,796 | A | 4/1988 | Endo et al. .............. 346/1.1 |
| 6,089,697 | A * | 7/2000 | Tajika et al. .............. 347/43 |
| 6,114,411 | A | 9/2000 | Nakamura et al. ......... 523/161 |
| 2003/0137679 | A1 | 7/2003 | Nakazawa et al. ......... 358/1.6 |
| 2004/0042047 | A1* | 3/2004 | Kawatoko et al. ........ 358/3.06 |
| 2004/0169710 | A1* | 9/2004 | Ide et al. ................. 347/101 |

FOREIGN PATENT DOCUMENTS

| JP | 59-123670 | 7/1984 |
| JP | 59-138461 | 8/1984 |
| JP | 61-59911 | 12/1986 |
| JP | 61-59912 | 12/1986 |
| JP | 61-59914 | 12/1986 |
| JP | 9-208870 | 8/1997 |
| JP | 2001-200183 | 7/2001 |
| JP | 2001-323192 | 11/2001 |

* cited by examiner

*Primary Examiner*—Lam S Nguyen
(74) *Attorney, Agent, or Firm*—Fitzpatrick, Cella, Harper & Scinto

(57) ABSTRACT

An ink jet recording apparatus includes a recording head including a plurality of recording elements for ejecting ink in accordance with image data, wherein an image is formed by carrying out a recording scan N times for the same image area on a recording material, where N is an integer not less than 1, and a setting unit for setting a value of N in accordance with information relating to a glossiness of the recording material.

6 Claims, 8 Drawing Sheets

INK JET RECORDING APPARATUS AND INK JET RECORDING METHOD

FIELD OF THE INVENTION AND RELATED ART

The present invention relates to an ink jet recording apparatus, in particular, a method for controlling an ink jet recording apparatus in terms of the level of surface glossiness of the recorded areas of recording medium, which will be achieved by the apparatus when forming an image on recording medium high in glossiness level.

An ink jet recording method is a recording method which records an image on a recording medium by adhering recording liquid to the recording medium, such as paper, by ejecting minute particles (droplets) of recording liquid (ink) from recording elements. As means for ejecting ink droplets, various means are available. However, an electrothermal transducer has come to be widely used in recent years, because a recording head design which places an electrothermal transducer in a recording element make is easier to place a large number of recording liquid ejection orifices at a high density, therefore making it possible to record an image at high speed as well as in high density (Japanese Patent Application Publication 61-59911, 61-59912, and 61-59914).

As for the ink used for ink jet recording, most of the inks in the past have been the combinations of water as a solvent and a water-soluble dye as a coloring agent. Most of the coloring agents in such inks easily permeate, along with water, into recording medium, leaving therefore the recording medium smooth across the surface. Therefore, when such inks are used to record on smooth and glossy recording medium, the recording medium remains smooth and glossy across the surface. In other words, the usage of one of such inks and smooth and glossy recording medium made it possible to obtain a highly glossy copy. Consequently, the problems related to the production of glossy copies have been dealt with by improving recording medium.

In recent years, however, demand has increased for means for obtaining copies more lightfast and water-resistant than the copies obtained with the use of a recording means in accordance with the prior art. As the answer to this demand, research has been carried out to develop ink, the coloring agent of which is pigment (which hereinafter will be referred to as pigment ink). Generally, a pigment ink does not as easily permeate into recording medium along with water, as a dye ink. Therefore, it is problematic in terms of its fixation to recording medium and the level of glossiness its achieves. The problems regarding fixation can be solved to a certain degree by using the so-called multi-pass recording method, for example.

FIG. 1 is a diagrammatic drawing depicting the multi-pass recording method. The multi-pass recording method is generally employed by an ink jet recording apparatus of the serial type. It is a recording method that forms an image in steps by scanning two or more times a given section of recording medium, with its recording head.

FIG. 1(a) shows a given section of the recording medium after the first recording scan of the section. In the drawing, designated by a referential number 1 are the dots formed by ink droplets having landed on the recording medium during the first recording scan. FIG. 1(a) shows the case in which they did not overlap with each other. FIG. 1(b) shows the same section of the recording medium after the second recording scan of the section. Designated by a referential number 2 in the drawing are the dots formed during the second recording scan. FIGS. 1(c) and 1(d) show the same section of the recording medium after the third and fourth recording scans, respectively. Designated by referential numbers 3 and 4 in the drawings are the dots formed by ink droplets having landed on the recording medium during the third and fourth recording scan. The recording on this section of the recording medium has been completed through the abovementioned four recording scans of this section. On which points on the recording medium an ink droplet is to be deposited during each recording scan is determined by processing (AND-processing) the recording data, and the binary data which is called the master pattern.

In the multi-pass recording method, recording medium is conveyed during the interval between one recording scan and the following recording scan. Thus, recording medium receives ink droplets with predetermined intervals in time. Therefore, the ink droplets deposited during a given recording scan are given a certain length of time to dry before the recording medium is given ink droplets again. In other words, the usage of the multi-pass recording method makes it possible to record even on such recording medium as ordinary paper that is slow in terms of the absorption of pigment ink, because the multi-pass recording method makes it possible to record while affording ink droplets a certain length of time to dry as it deposits them on the recording medium. Therefore, the multi-pass recording method is excellent as far as fixation is concerned.

Also in the multi-pass recording method, recording medium is conveyed during the scan intervals. Therefore, a recording element which records on a given section of recording medium during one of the multiple recording scans of the section is different from the recording element which records on the same section during another of the multiple recording scans of the section. Therefore, even if a given recording element is, or becomes, somewhat erroneous in ejection, the multi-pass recording method disperses the resultant image defects, making them inconspicuous. The multi-pass recording method can also render inconspicuous the white or black streaks which sometimes occur at the borderline between the adjacent two areas of recording medium, which are different in the order of scan, due to the inconsistency in the amount by which recording medium is conveyed. The above described nonuniformity in ejection among the plurality of recording elements, and the nonuniformity in the amount by which recording medium is conveyed per scan interval, which are inevitable because of the uncontrollable conditions in manufacturing process and the tolerance in manufacture, are parts of the significant causes of the formation of defective images. Thus, the above described multi-pass recording method is a part of the very important recording technologies necessary for forming high quality images, and has been very widely used.

However, a new problem was discovered by the inventors of the present invention that when the multi-pass recording method was used to form an image on such recording medium as glossy paper, that is, recording medium, the surface of which has been given a specific treatment, the resultant image will not be as glossy, across the ink-covered areas thereof, as the surface of the glossy recording medium on which the image is formed.

Generally, the surface of glossy paper or the like recording medium is provided with minute pores to improve the recording medium in ink solvent absorption and coloring agent fixation. Thus, when dye ink is used to record on glossy paper or the like recording medium, the dye in the ink is absorbed into the recording medium, along with water, through the minute pores. In the case of pigment ink, however, it is difficult for the coloring agent to permeate into the recording medium, along with water, for the following reason. That is, pigment does not easily dissolve into water, remaining thereby simply dispersed in water in the form of microscopic particles, which are greater in size than the abovementioned pores of the recording medium, making it difficult for pigment to permeate into the recording medium. Thus, the pigment, that is, pigment particles, are fixed to the surface of the recording medium as if they are accumulated on the surface of the recording medium. As a result, the surface of the recording medium is reduced in flatness. This has been thought to be the reason why glossy paper or the like medium loses its glossiness as pigment ink is used to record thereon.

Even if pigment ink, which is not easily absorbed by glossy paper or the like recording medium, is used for recording on glossy recording medium, the recording medium maintains a certain degree of glossiness as long as the areas of the recording medium, across which ink has been deposited (which hereinafter will be referred to as recorded areas), maintain a certain degree of flatness. However, the careful studies made by the inventors of the present invention revealed that the employment of the multi-pass recording method along with pigment ink results in the formation of an image which is substantially less in glossiness across the recorded area than an image formed with the use of pigment ink without using the multi-pass recording method.

As for the measures for improving an ink jet recording apparatus in terms of the glossiness of the recorded areas of glossy recording medium, several proposals have already been made. For example, Japanese Laid-open Patent Application 2001-200183 discloses a recording method in which after ink is deposited onto recording medium, coloring agent of the ink (pigment) is fixed to recording medium with the use of a heat roller to improve in glossiness the recorded areas of the recording medium.

Further, Japanese Laid-open Patent Application 2001-323192 discloses a recording method, according to which photo-curable monomer or oligomer is added to pigment ink, and the ink is hardened by exposing the recorded surface of the recording medium to ultraviolet rays or the like after the deposition of ink onto the recording medium. According to this publication, resin film is formed on the deposited ink, by the irradiation ultraviolet rays or the like, whereby the recorded areas of recording medium are improved in flatness and glossiness.

As one of the means for improving, from ink side, an ink jet recording apparatus in terms of the glossiness of the recorded areas of recording medium, such ink has been proposed that is no more than 200 nm in average pigment particle diameter, and contains at least resin emulsion which is no more than 200 nm in average particle diameter (For example, Japanese Laid-open Patent Application 9-208870).

However, methods such as those disclosed in abovementioned Japanese Laid-open Patent Applications 2001-200183 and 2001-323192 require the heat roller for heating recording medium, means for irradiating ultraviolet rays or the like to illuminate recording means, or the like. Therefore, not only does their employment increase a recording apparatus in size, but also, complicates the image formation process. In recent years, it has become very important that not only is an ink jet recording apparatus higher in image quality and faster in recording speed, but also, that it is inexpensive. Therefore, providing an ink jet recording apparatus with an additional structure of a relatively large scale, as is disclosed in the abovementioned Japanese Laid-open Patent Applications, in order to restore in glossiness the recorded areas of recording medium, cannot be said to be practical.

Further, adding resin emulsion to pigment ink as is disclosed in Japanese Laid-open Patent Application 9-208870 tends to cause such problems that as an ink jet recording apparatus increases in cumulative usage, it becomes in stable in terms of the ink ejection from a recording element, and also, ejection orifices are plugged with solidified ink, resulting sometimes in ejection failure.

SUMMARY OF THE INVENTION

The present invention was made to solve the above described problems. Its primary object is to provide a recording method which makes it possible for an ink jet recording apparatus of the serial type, to record even on glossy recording medium, an image, the recorded areas of which are very close (or virtually identical) in glossiness level to the unrecorded areas of the recording medium, with the use of pigment ink containing no resin emulsion, without requiring post-processing of recording medium, for example, image fixation by a heat roller, image hardening by ultraviolet rays irradiation, or the like.

The present invention for achieving the above described object is characterized in that an ink jet recording apparatus which forms an image by moving its recording head, comprising a plurality of recording elements for ejecting ink in response to recording signals generated in accordance with image formation data, across a given unit of recording area of recording medium, N number of times, in a manner of scanning the unit of recording area, is provided with a means for setting the value of N according to the information related to the glossiness level of the recording medium.

According to an aspect of the present invention, there is provided an ink jet recording apparatus comprising a recording head including a plurality of recording elements for ejecting ink in accordance with image data, wherein an image is formed by carrying out recording scan N times for the same image area on a recording material, where N is an integer not less than 1; and setting means for setting a value of N in accordance with information relating to a glossiness of the recording material.

According to another aspect of the present invention, there is provided an ink jet recording apparatus comprising a recording head including a plurality of recording elements for ejecting ink in accordance with image data, wherein an image is formed by carrying out recording scan N times for the same image area on a recording material, where N is an integer not less than 1; obtain means for obtaining information indicative of a kind of a recording material in use from a plurality of kinds of recording materials including a first recording material having a predetermined glossiness and a second recording material having a glossiness higher than the predetermined glossiness; and setting means for setting a value of N on the basis of the information obtained by said obtain means, wherein when said obtain means obtains information corresponding to the second recording material, said setting means sets the value of N which is smaller than the value of N which is set when said obtaining means obtains information corresponding to the first recording material.

According to a further aspect of the present invention, there is provided an ink jet recording apparatus comprising a recording head including a plurality of recording elements for ejecting ink in accordance with image data, wherein an image is formed by carrying out recording scan a plurality of times for the same image area on a recording material; obtain means for obtaining information indicative of a kind of a recording material in use from a plurality of kinds of recording materials including a first recording material having a predetermined glossiness and a second recording material having a glossiness higher than the predetermined glossiness; a storing portion for storing combinations of mask patterns which includes a first mask pattern combination in which a ratio of ink dots which are recorded adjacent to each other in the same scan is relatively larger and a second mask pattern combination in which a ratio of ink dots which are recorded adjacent to each other in the same scan is relatively smaller; and selecting means for selecting a mask pattern combination from the mask pattern combinations stored in said storing portion, wherein when said obtain means obtains information corresponding to the first recording material, said selecting means selects the second mask pattern combination, and when said obtain means obtains information corresponding to the second recording material, said selecting means selects the first mask pattern combination.

According to a further aspect of the present invention, there is provided an ink jet recording method using a recording head including a plurality of recording elements for ejecting ink in accordance with image data, wherein an image is formed by carrying out recording scan N times for the same image area on a recording material, where N is an integer not less than 1, said method comprising a step of setting a value of N in accordance with information relating to a glossiness of the recording material.

According to the above described structural arrangement, it is possible to control an ink jet recording apparatus in terms of the flatness of the recorded areas of recording medium, which is affected by the pattern in which pigment ink droplets are deposited on the recording medium. Therefore, it is possible to yield an image, the recorded areas of which have an optimal level, or desired level, of glossiness relative to the glossiness level of the recording medium on which the image is formed.

These and other objects, features, and advantages of the present invention will become more apparent upon consideration of the following description of the preferred embodiments of the present invention, taken in conjunction with the accompanying drawings.

DETAILED DESCRIPTION OF PREFERRED EMBODIMENTS

Hereinafter, the preferred embodiments of the present invention will be described in detail.

Figure 2:
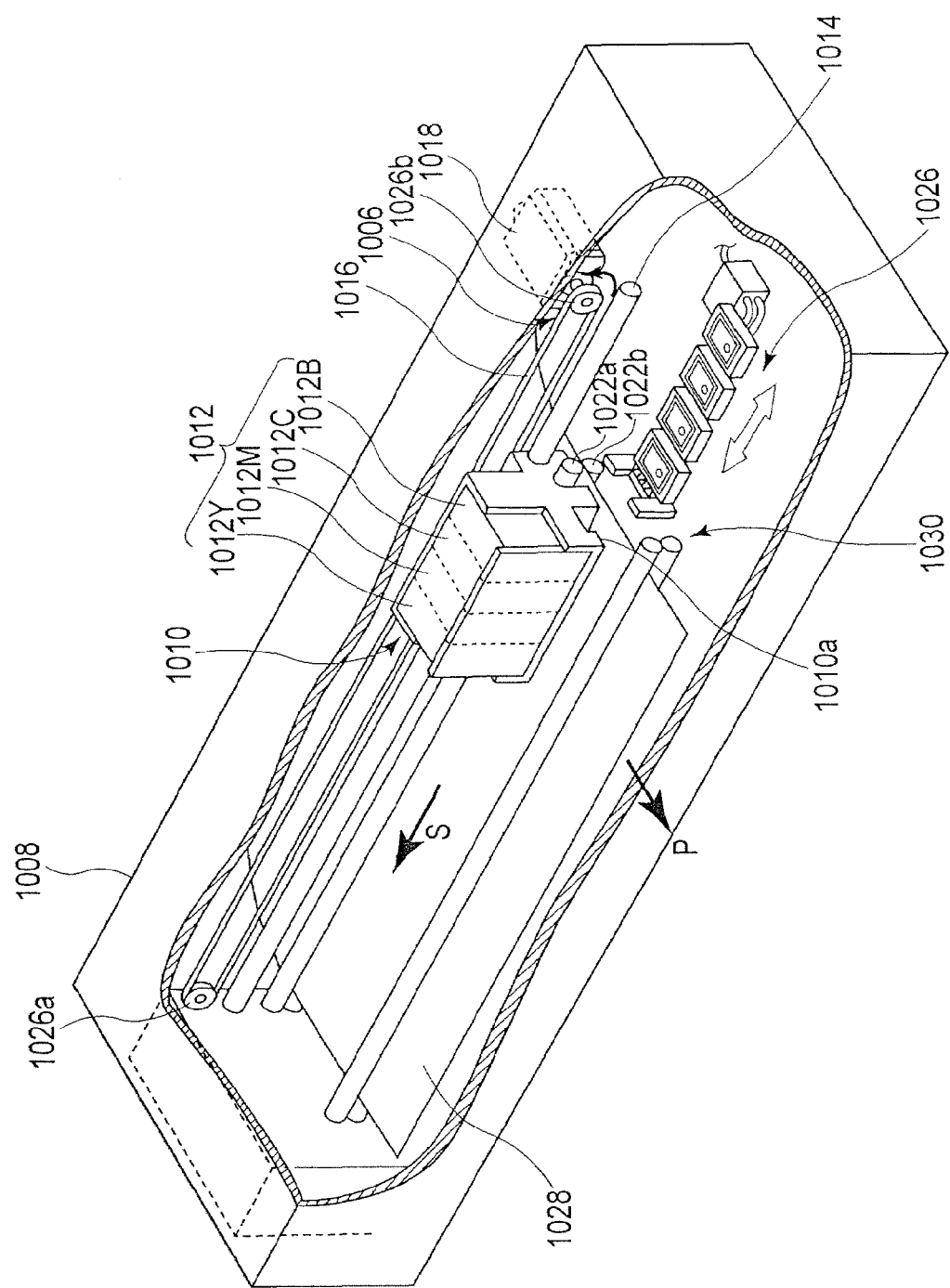
FIG. 2 is a schematic perspective view of the ink jet recording apparatus in the first embodiment of the present invention, showing the general structure of the essential portion of the apparatus.

FIG. 2 is a schematic perspective view of the ink jet recording apparatus in one of the preferred embodiments of the present invention, showing the general structure of the essential portion of the apparatus. Referring to FIG. 2, the ink jet recording apparatus comprises: a casing 1008; a conveying apparatus 1030 which extends in the casing 1008 in the direction parallel to the lengthwise direction of the casing 1008, and intermittently conveys a paper 1028 as recording medium in the direction indicated by an arrow mark P; a recording portion 1010 which is reciprocally moved on a guiding shaft 1014, roughly in parallel to the direction indicated by an arrow mark S which is roughly perpendicular to the direction P in which paper 1028 is conveyed; and a carriage driving portion 1006 as a driving means for reciprocally moving the recording portion 1010. The carriage driving portion 1006 comprises: a pair of pulleys 1026*a* and 1026*b* rotatably fitted around a pair of shafts, one for one, with the provision of a predetermined distance between the two; a belt 1016 wrapped around the pulleys 26; a pair of roller units 1022*a* and 1022*b*; a motor 1018 for driving in the normal as well as reverse directions the belt 1016 stretched roughly in parallel to the pair of roller units 1022 and connected to a carriage 1010*a* of the recording portion 1010.

As the motor 1018 is activated, the belt 1016 is rotated either in the direction indicated by an arrow mark R or in reverse. As the belt 1016 is rotated in the direction indicated by the arrow mark R, the carriage 1010*a* of the recording portion 1010 is moved in the predetermined direction indicated by an arrow mark S by a predetermined distance, whereas when the belt 1016 is rotated in the reverse direction, the carriage 1010*a* of the recording portion 1010 is moved in the direction opposite to the arrow S direction, by the predetermined distance. The ink jet recording apparatus is also provided with a recovery unit 1024 for carrying out the process of restoring the liquid ejection performance of the recording portion 1010. The recovery unit 1024 is located at one end of the carriage driving portion 1006, which constitutes the home position of the carriage 1010*a*. It is disposed so that it faces the ink ejection orifices of the recording portion 1010 when the carriage 1010*a* is in its home position.

The recording portion 1010 comprises four ink jet cartridges (each of which hereinafter may be referred to simply as cartridge 1012) 1012Y, 1012M, 1012C, and 1012B for recording with four inks different in color, one for one. In the cartridges, pigment inks containing yellow, magenta, cyan, and black pigments, for example, are stored, one for one. The four ink cartridges 1012 are removably mounted on the carriage 1010*a*. The ink in each cartridge 1012 is supplied to a corresponding unshown recording head, from which the ink is ejected in accordance with image formation data.

Figure 3:
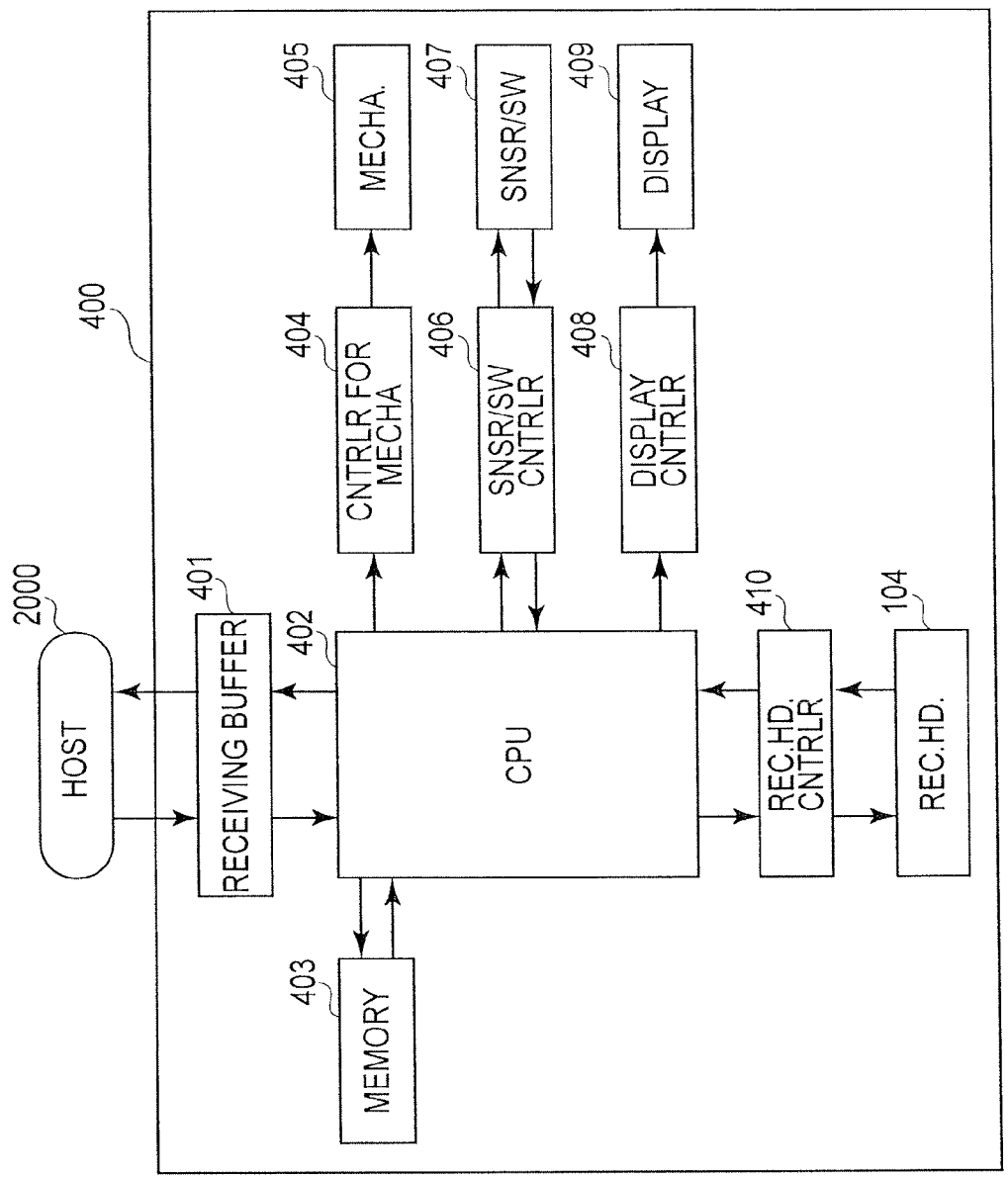
FIG. 3 is a block diagram showing the control system of the ink jet recording apparatus in the first embodiment.

FIG. 3 is a block diagram depicting the structure of the control system of the ink jet recording apparatus in this embodiment. Designated by a referential number 400 in the drawing is the ink jet recording apparatus in this embodiment, which is connected to an external host computer 2000. Designated by a referential number 402 is a CPU, which controls the functions of the various internal portions of the ink jet recording apparatus 400. The data of the characters and images to be inputted from the host computer 2000 are inputted into the ink jet recording apparatus 400 through a reception buffer 401. Further, the signals for informing the host computer 2000 whether or not the data have been correctly received are transmitted to the host computer 2000 also through the buffer 401. The data which are transmitted or received through the buffer 401 are transferred to a memory portion 403 while remaining under the control from the CPU, and are temporarily stored in the RAM of the memory portion 403. In this memory portion 403, the control programs for controlling the recording operation, recovery operation, and the like, carried out by the ink jet recording apparatus, and the data of the mask patterns used for the multi-pass recording method, are stored.

A mechanical control portion 404 controls the driving of the mechanical portion 405, such as a carriage motor, a line feed motor, and the like, in response to the commands from the CPU 402. A sensor/SW control portion 406, made up of various sensors and switches (SW), transfers the signals from the sensor/SW portion 407 to the CPU 402. A display element control portion 408 controls the LEDs of a display panel, and a display portion 409 comprising liquid crystal elements, in response to the commands from the CPU 402. A recording head control portion 410 controls the recording head 104 in response to the commands from the CPU 402. It also detects the temperature and the like, that is, the information which reflects the condition of the recording head 104, and informs the CPU 402 of the detected information.

Figure 4:
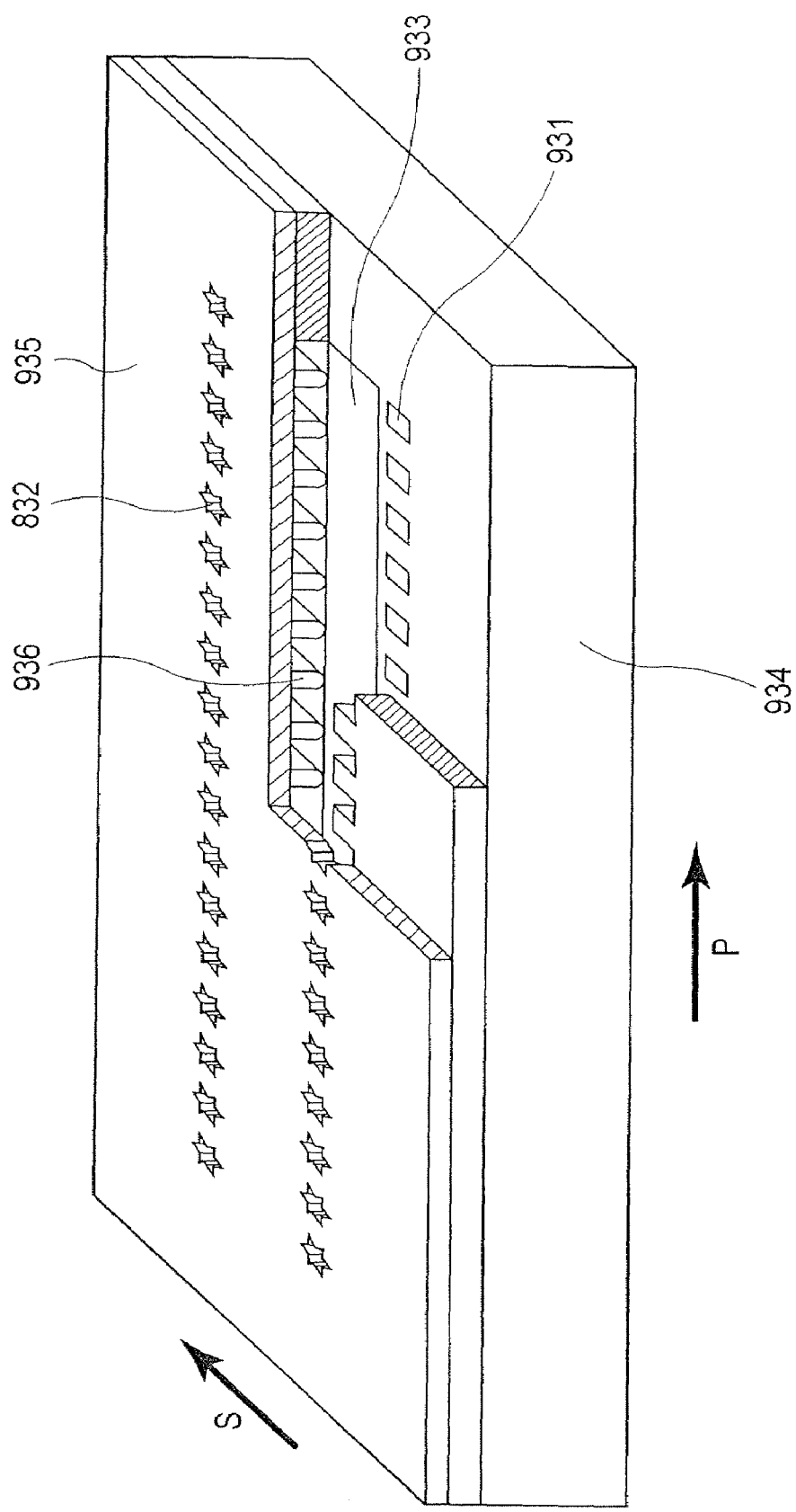
FIG. 4 is a schematic perspective view of the ink jet recording head for one of the plurality of colors in which the ink jet recording heads in the first embodiment of the present invention record.

FIG. 4 is a schematic perspective view of the ink jet recording head for one of the plurality of colors in which the ink jet recording apparatus in the first embodiment of the present invention records. The recording head 104 in this embodiment has a substrate 934 formed of glass, ceramic, plastic, metal, or the like. The material for the substrate 934 has little to do with the gist of the present invention. In other words, the material for the substrate 934 does not need to be limited to a specific substance. All that is necessary is that the substance selected as the material for the substrate 934 is suitable for forming a part of a liquid passage forming member, and also, for forming the portion for supporting a plurality of elements for generating ink ejection energy, and a layer comprising liquid passages and ejection orifices, which will be described later. To describe in more detail this subject with reference to a case in which silicon wafer is used as the material for the substrate 934 for the recording head 104, the recording head 104 has a plurality of ink ejection orifices, which are above the substrate 934. As for the method for forming the ink ejection orifices, there is a method which uses a beam of laser light. There is also an ejection orifice forming method in which a photosensitive resin is used as the material for an orifice plate 935 (liquid ejection plate), and the ejection orifices are formed in the orifice plate 935 with the use of an exposing apparatus such as MPA (Mirror Projection Aligner) or the like.

Also referring to FIG. 4, the substrate 934 supports a plurality of electrothermal transducers 931 (which hereinafter may be referred to as heaters), and a trunk ink passage 933 as a common liquid chamber in the form of a long groove. The substrate 934 also supports a plurality of heaters 931 disposed in two straight lines on each side of the trunk ink passage 933, one for one, so that the heaters on one side of the trunk ink passage 933 are offset, in terms of the direction parallel to the trunk ink passage 933, from the corresponding heaters on the other side of the trunk ink passage 933. In each line of heaters 933, the heaters 933 are disposed at a pitch of 600 dpi.

The substrate 934 is provided with a plurality of ink passage walls 936, which support an ejection orifice plate 935 having a plurality of ejection orifices 382 which oppose one for one the plurality of heaters 931 on the substrate 934.

FIG. 4 illustrates each ink passage wall 936 as a component independent from the ejection orifice plate 935. However, this setup is not mandatory. For example, the ink passage walls 936 and ejection orifice plate 935 can be formed as parts of a single component, by forming the ink passage walls 936 on the substrate 934 with the use of the spin coating method or the like. The external surface 935a (top surface) of the ejection orifice plate 935 is rendered water repellent.

The arrow marks S and P in the drawing show the same directions as the directions indicated by the arrow marks S and P, respectively, in FIG. 2. The ink jet recording apparatus 400 is structured so that an image is formed on the paper 1028 as recording medium by alternate repetitions of the primary scanning process in which the recording head is moved in the arrow P direction, and the secondary scanning process in which the recording medium is conveyed in the arrow S direction.

Next, the pigment ink compatible with this embodiment of the present invention will be described. The list of pigment inks mentioned below are a list of the examples of pigment inks compatible with this embodiment, and is not intended to limit the scope of the present invention. Obviously, the widely known technologies disclosed in the Japanese Laid-open Patent Applications mentioned in the preceding Background Art section may be utilized.

In order for a given pigment as the pigment for pigment ink to be compatible with this embodiment, it is desired to be in the range of 1-20 wt. %, preferably, 2-12 wt. %, in terms of weight ratio (ratio of total amount in weight of pigment in pigment ink relative to total weight of pigment ink). Presented below in groups according to color are the pigments compatible with this embodiment of the present invention.

As the black pigments, carbon black can be listed as the prime candidate, for example, the carbon black manufactured by the furnace method, or channel method, which is in the range of 15-40 mμ (nm) in terms of primary particle diameter; in the range of 50-300 $m^2/g$ in terms of the specific surface measured in BET method; in the range of 40-150 ml/100 g in terms of DBP oil absorption amount; in the range of 0.5-10% in volatile component content; and in the range of 2-9 in pH value. As commercially available carbon black having properties such as those mentioned above, there are No. 2300, No. 900, MCF88, No. 33, No. 40, No. 45, No. 52, MA7, MA8, No.2200B (which are products of Mitsubishi Kasei Corp), RAVEN 1255 (product of Columbian Chemical Company), REGAL400R, REGAL330R, REGAL660R, MOGUL L (which are products of Cabot Corp), Color Black FW1, Color Black FW18, Color black S170, Color Black S150, Printex 35, and Printex U (which are products of Degussa Co., Ltd.), etc.

As the yellow pigment, C. I. Pigment Yellow 1, C. I. Pigment Yellow 2, C. I. Pigment Yellow 3, C. I. Pigment Yellow 13, C. I. Pigment Yellow 16, C. I. Pigment 83, etc., can be listed.

As the magenta pigment, C. I. Pigment Red 5, C. I. Pigment Red 7, C. I. Pigment Red 12, C. I. Pigment Red 48 (Ca), C. I. Pigment Red 48 (Mn), C. I. Pigment 57 (Ca), C. I. Pigment Red 112, C. I. Pigment Red 122, etc., can be listed.

As the cyan pigment, C. I. Pigment Blue 1, C. I. Pigment Blue 2, C. I. Pigment Blue 3, C. I. Pigment Blue 15, C. I. Pigment Blue 16, C. I. Pigment Blue 22, Vat Blue 4, Vat Blue 6, etc., can be listed.

Further, new types of pigment such as pigments of the self dispersing type may be used.

As for the pigment dispersing agent, any pigment dispersing agent will suffice as long as it is a water-soluble resin. However, it is desired to be in a range of 1,000-30,000, preferably, a range of 3,000 15,000, in weight average molecular weight. As concrete examples of such pigment dispersant, block copolymer, random copolymer, or graft copolymer, which comprises at least two, or more, monomers selected from among styrene, styrene derivatives, vinyl naphthalene, vinyl naphthalene derivatives, aliphatic alcohol ester etc., of unsaturated $\alpha$, $\beta$-ethylic carboxylic acid, acrylic acid, acrylic acid derivatives, maleic acid, maleic acid derivatives, itaconic acid, itaconic acid derivatives, fumaric acid, fumaric acid derivatives, vinyl acetate, vinyl pyrrolidone, acrylamide, and their derivatives (at least one of which is a hydrophilic polymerizable monomer) can be listed. Alternatively, it is also possible to use natural resin, preferably, rosin, shellac, and starch. These resins are soluble in aqueous solutions containing dissolved bases and belong to alkali-soluble resins. The ratio in weight of these water-soluble resins used as pigment dispersant relative to the entirety of pigment ink is desired to be in the range of 0.1-5 wt. %. However, the smaller the ratio of the pigment dispersant weight relative to the total weight of the pigment ink, the more apparent the effects of the present invention.

Incidentally, it is desired that a pigment ink which contains any of the above described pigments is adjusted to be neutral or alkaline. Such adjustment makes it easier for the water-soluble resin as pigment dispersant to dissolve, improving thereby color ink in shelf life. However, this may lead to corrosion of the various parts of an ink jet recording apparatus. Therefore, the pH of pigment ink is desired to be adjusted to a value in the range of 7-10. As examples of pH adjustment agent, various organic amines such as diethanolamine, triethanolamine, etc., inorganic alkali, for example, alkali metal hydroxides, such as sodium hydroxide, lithium hydroxide, potassium hydroxide, etc., organic acid, mineral acid, can be listed. Such pigment as those listed above, and such water-soluble resin, as dispersant, as those listed above, are dispersed or dissolved in an aqueous medium.

The aqueous medium preferable as the medium for pigment ink in accordance with the present invention is desired to be a mixture of water and water-soluble organic solvent. Further, the water is desired not to be ordinary water which contains various ions; it is desired to be ion exchange water (deionized water).

As the water-soluble organic solvent to be mixed into water to yield the aqueous medium, $C_1$-$C_4$ alkyl alcohol such as methyl alcohol, ethyl alcohol, n-propyl alcohol, isopropyl alcohol, n-butyl alcohol, sec-butyl alcohol, tert-butyl alcohol, etc.; amide such as dimethylformamide, dimethylacetoamide, etc.; ketones or ketoalcohols, such as acetone, diacetone alcohol, etc.; ethers such as tetrahydrofuran, dioxane, etc.; polyalkylene glycol such as polyethylene glycol, polypropylene glycol, etc.; alkylene glycol such as ethylene glycol, propylene glycol, butylene glycol, triethylene glycol, 1,2,6-hexanetriol, thiodiglycol, hexylene glycol, diethylene glycol, etc., in which alkylene groups contain 2 to 6 carbon atoms; lower alkyl ethers of polyhydric alcohols such as glycerin, ethylene glycol monomethyl (or ethyl) ether, diethylene glycol methyl (or ethyl) ether, triethylene glycol monomethyl (or ethyl) ether, etc.; N-methyl-2-pyrrolidone, 2-pyrrolidone, 1,3-dimethyl-2-imidazolidinone;etc., can be listed. Among the large number of water-soluble organic solvents listed above, polyatomic alcohol such as diethylene glycol, and lower alkyl ethers of polyatomic alcohol, such as triethylene glycol monomethyl (or ethyl) ether, are preferable.

The content of water-soluble organic solvent, such as those listed above, in pigment ink is desired to be in a range of 3-50 wt. %, preferably, 3-40 wt. %. As for the water content of pigment ink, it is desired to be in a range of 10-90 wt. %, preferably, 30-80 wt. %.

Regarding the pigment inks compatible with the present invention, in particular, this embodiment of the present invention, in order to give color ink a desired property or properties in addition to the abovementioned properties, surfactant, defoaming agent, preservative, etc., may be added as necessary. In particular, surfactant which functions as permeation accelerator needs to be added by a proper amount for making the liquid components of pigment ink quickly permeate into recording medium. As for the amount by which surfactant is to be added, it is desired to be in a range of 0.05-10 wt. %, preferably, 0.5-5 wt. %. As anionic surfactant, commonly used ones may be used with desired effects, for example, carboxylate, sulfuric ester, sulfonate, phosphate ester, etc.

Next, the method for manufacturing pigment ink will be described. First, pigment is added to water-soluble medium made up of at least water-soluble resin as dispersant and water, and the mixture is stirred. Then, the mixture is subject to a process in which the pigment is dispersed with the use of a dispersing means, which will be described later, obtaining thereby a desired solution (if necessary, the solution may be processed with the use of a centrifuge). Then, to this solution in which pigment has been dispersed, sizing agent, and the additives optionally selected from among those listed above, are added. Then, the mixture is stirred to obtain the final product, or pigment ink.

When using alkali-soluble resin, such as those listed above, as dispersant, it is necessary to add base to dissolve the resin. As the examples of the base to be added for this purpose, such organic amines as monoethanol amine, diethanol amine, triethanol amine, or amine-ethyl-propanol amine, or such inorganic amines as potassium hydroxide or sodium hydroxide are preferable.

Regarding the pigment ink manufacturing method, stirring no less than 30 minutes the mixture of water and pigment before subjecting the mixture to the pigment dispersing process improves the pigment ink manufacturing method in productivity, because this kind of pre-mixing operation improves the pigment in wettability, improving thereby the pigment in terms of the dispersant adherence to the pigment surface.

As for the type of the abovementioned apparatus for pigment dispersion, any of the widely used dispersing apparatuses will suffice. For example, a ball mill, a roll mill, a sand mill, and the like can be listed. Among the dispersing apparatuses such as those listed above, a sand mill is preferable. As for the type of sand mill, a super mill, sand grinder, a bead mil, an agitator mill, a grain mill, a dyno-mill, a pearl mill, and a cobol mill (all of which are commercial names), can be listed.

In order to prevent pigment ink from plugging up a recording element when using an ink jet recording apparatus which uses pigment ink, it is important to use such pigment ink that is optimal in particle size distribution. As the means for obtaining a pigment with a desired particle size distribution, reducing a dispersing apparatus in the size of pulverization medium, increasing a pulverization medium in fill factor, prolonging the processing time, reducing ejection speed, classifying pigment with a filter, a centrifuge, or the like, after pulverization, a combination of the preceding methods, or the like method, can be listed.

Next, the method for recording an image with the use of the ink jet recording apparatus in this embodiment will be described. Not only is the ink jet recording apparatus in this embodiment capable of recording on ordinary paper, but also, on glossy paper, that is, high quality paper which is glossy across its surfaces, matte paper, that is, paper which is not glossy, and the like. The above described multi-pass recording method is compatible with any of the above listed recording media. In this embodiment, however, the multi-pass recording method is adjusted in the number of passes (recording scans), and the mask attributes, according to the type of recording medium. It is assumed that the memory 403 shown in FIG. 3 has been pre-loaded with the various mask patterns matching various recording media.

Figure 5:
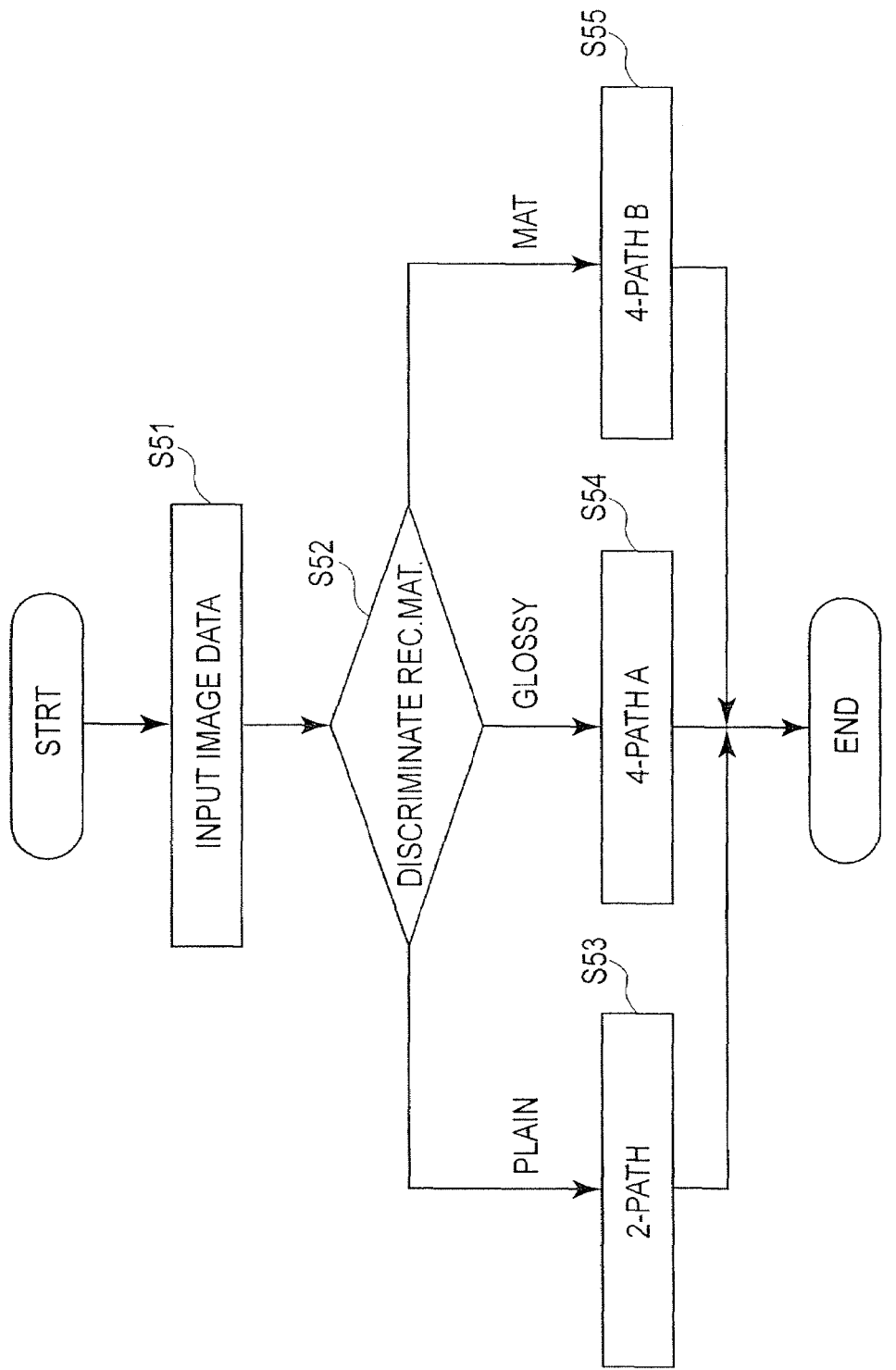
FIG. 5 is a flowchart of the recording operation of the ink jet recording apparatus in the first embodiment of the present invention, showing the decision making process and recording process of the apparatus.

Referring to FIG. 5, which is a flowchart depicting the decision making process and recording process carried out by the CPU 402 during a recording operation, as a recording operation is started, the CPU 402 first receives image data from the host computer 2000 in Step S51. The image data includes such information as the type of recording medium, in addition to the actual image data.

In Step S52, the received image data are analyzed, to determine which is the recording medium on which recording is to be made, ordinary paper, glossy paper, or matte paper. If it is determined to be ordinary paper, Step S53 is taken, in which an image is formed by the two-pass recording method. If it is determined to be glossy paper, Step S54 is taken, in which an image is formed by the four-pass recording method. Further, if it is determined to be matte paper, Step S55 is taken, in which an image is formed also by the four-path recording method.

Figure 6:
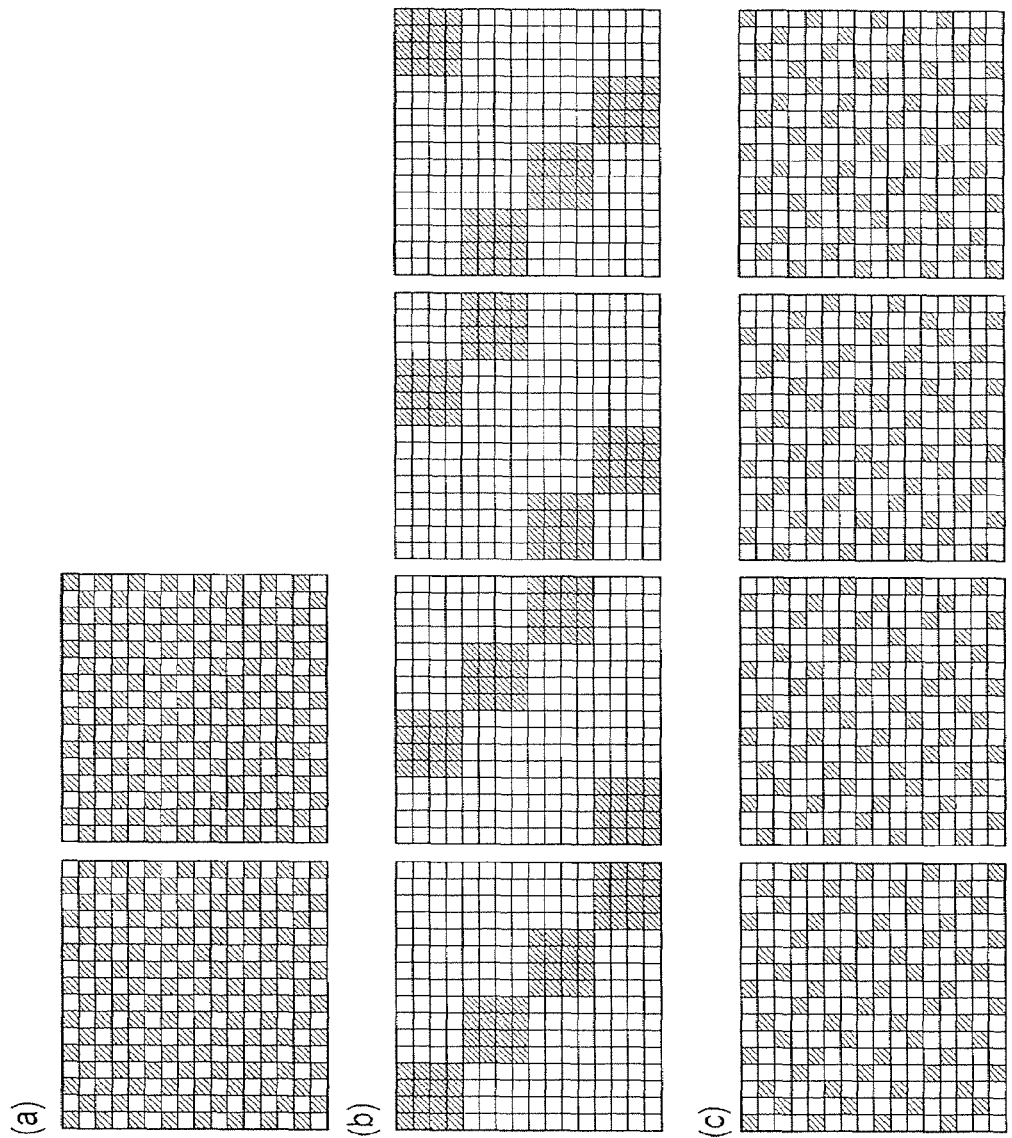
FIGS. 6(*a*)-6(*c*) are drawings of the mask patterns used by the ink jet recording apparatus in the first embodiment.

FIGS. 6(*a*)-6(*b*) show the mask patterns used in Steps S53-S55. Each of the individual squares in the mask patterns represents an area (single picture element) on which a single ink dot is formed. In other words, the drawings show mask patterns for an area of recording medium, the size of which is equivalent to 16 picture elements×16 picture elements. It may be thought that in actual recording, one of these mask patterns equivalent in size to 16 picture elements×16 picture elements is repeated in the vertical as well as horizontal directions.

FIG. 6(*a*) shows the mask patterns two-pass for the two-pass recording method, which are used with ordinary paper in Step S53. More specifically, during the first recording scan of a given section of recording medium in the two-pass recording mode, recording is made based on the recording data created by thinning the full recording data with the use of the mask pattern for the first pass (recording scan). Then, during the next pass, that is, the second recording scan of the given section of recording medium, recording is made based on the recording data created by thinning the full recording data with the use of the mask pattern for the second pass. The mask pattern for the first pass and the mask pattern for the second pass are complementary to each other. Therefore, the image formation data corresponding to a given recording area of recording medium are recorded in entirety through the above-mentioned two recording scans of the given area.

FIG. 6(*b*) shows the mask patterns for the four-pass recording method, which are used with glossy paper in Step S54. During the first recording scan of the recording medium, recording is made based on the recording data created by thinning the full recording data with the use of the mask pattern for the first pass as it was used when the recording medium was ordinary paper. Then, during the second, third, and fourth recording scans of the recording medium, recording is made based on the recording data created by thinning the full recording data with the use of the second, third, and fourth mask patterns, respectively. The first-fourth mask patterns are in the complementary relationship. Therefore, after the completion of the four recording scans of the given area of recording medium, the portion of the image formed across the given area reflects the entirety of the image formation data corresponding to the given area.

FIG. 6(*c*) shows the mask patterns for the four-pass recording method used in Step S55 in which an image is formed on matte paper. In the first recording scan of the recording medium, recording is made based on the recording data created by thinning the full recording data with the use of the mask pattern for the first pass as it was used when the recording medium was made on glossy paper. Then, in the second, third, and fourth recording scans of the recording medium, recording is made based on the recording data created by thinning the full recording data with the use of the second, third, and fourth mask patterns, respectively. The first-fourth mask patterns are in the complementary relationship. Therefore, after the completion of the four recording scans of the given area of recording medium, the portion of the image formed across the given area reflects the entirety of the image formation data corresponding to the given area of recording medium.

In both Steps S54 and S55, an image is formed by the four-pass recording method. However, the two methods are different in the mask patterns used for the four-pass recording method. FIG. 6(*b*) shows the mask pattern for the four-pass recording method, in which all the picture elements of a given area equivalent in size to 4 picture elements×4 picture elements are recorded during the same pass. In comparison, FIG. 6(*c*) shows the mask patterns for the four-pass recording method, in which adjacent two picture elements will be different in the recording pass (adjacent two picture elements will not be formed in the same pass); in other words, dots will be dispersed on recording medium so that no dot will be contiguously positioned to the next dot.

Figure 1:
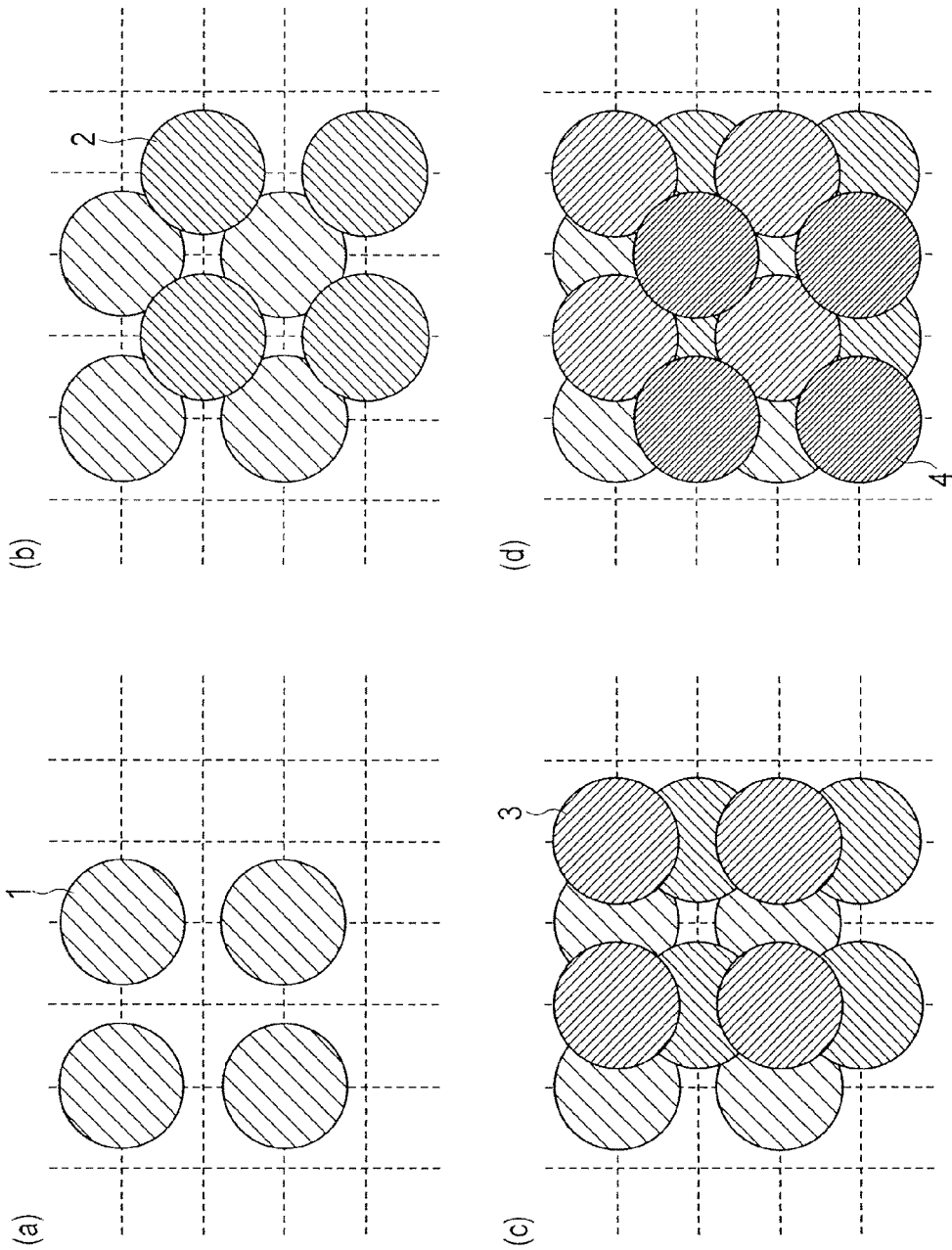
FIGS. 1(*a*)-1(*d*) are diagrammatic drawings for describing the multi-pass recording method.
Figure 7:
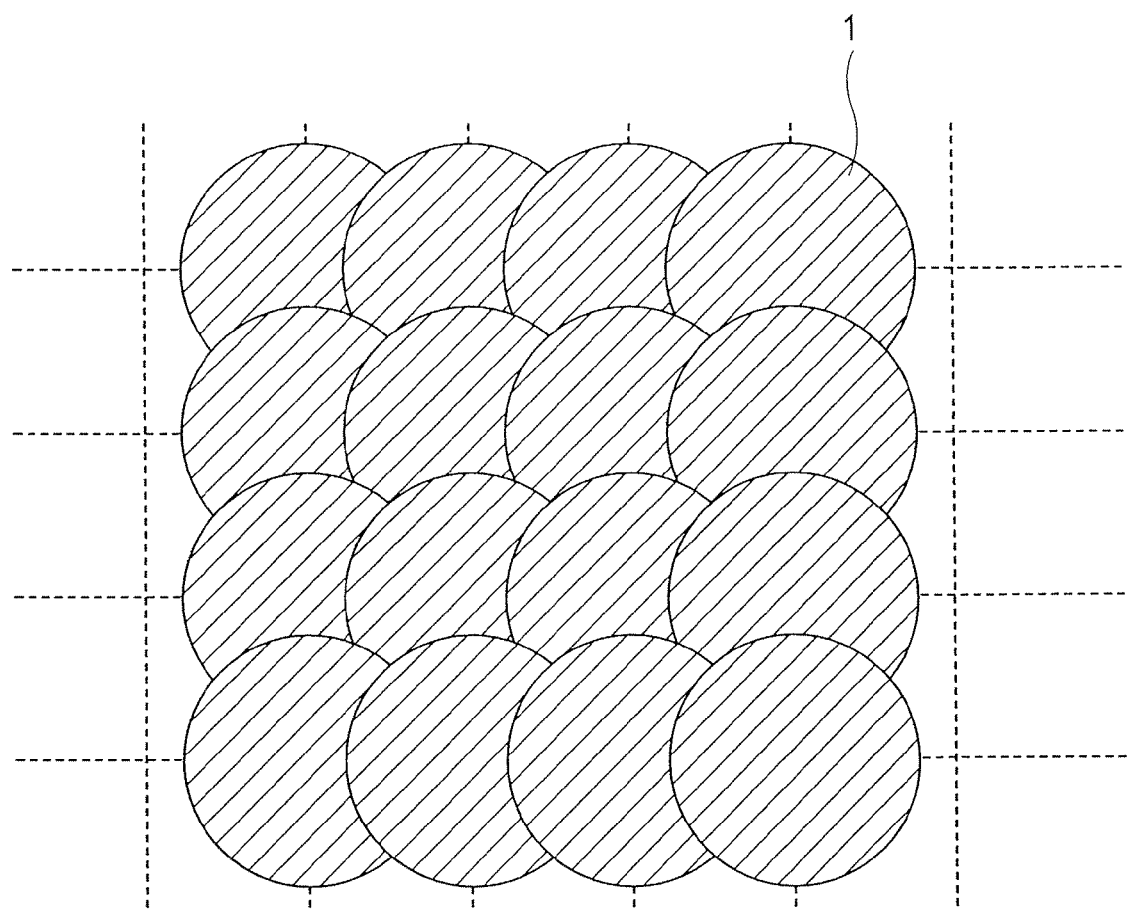
FIG. 7 is a diagrammatic drawing showing the pattern in which ink droplets are deposited on recording medium.

FIG. 7 shows how the dots appear after ink is deposited on recording medium using the masks shown in FIG. 6(*b*). The sixteen dots shown in this drawing are the same as those in FIG. 1(*d*), in terms of the size of the area of recording medium they cover. However, all sixteen dots shown in FIG. 7 are dots 1, which were recorded during the first recording scan of recording medium, and have been sequentially deposited in a simple, orderly, and partially overlapping manner.

Figure 8:
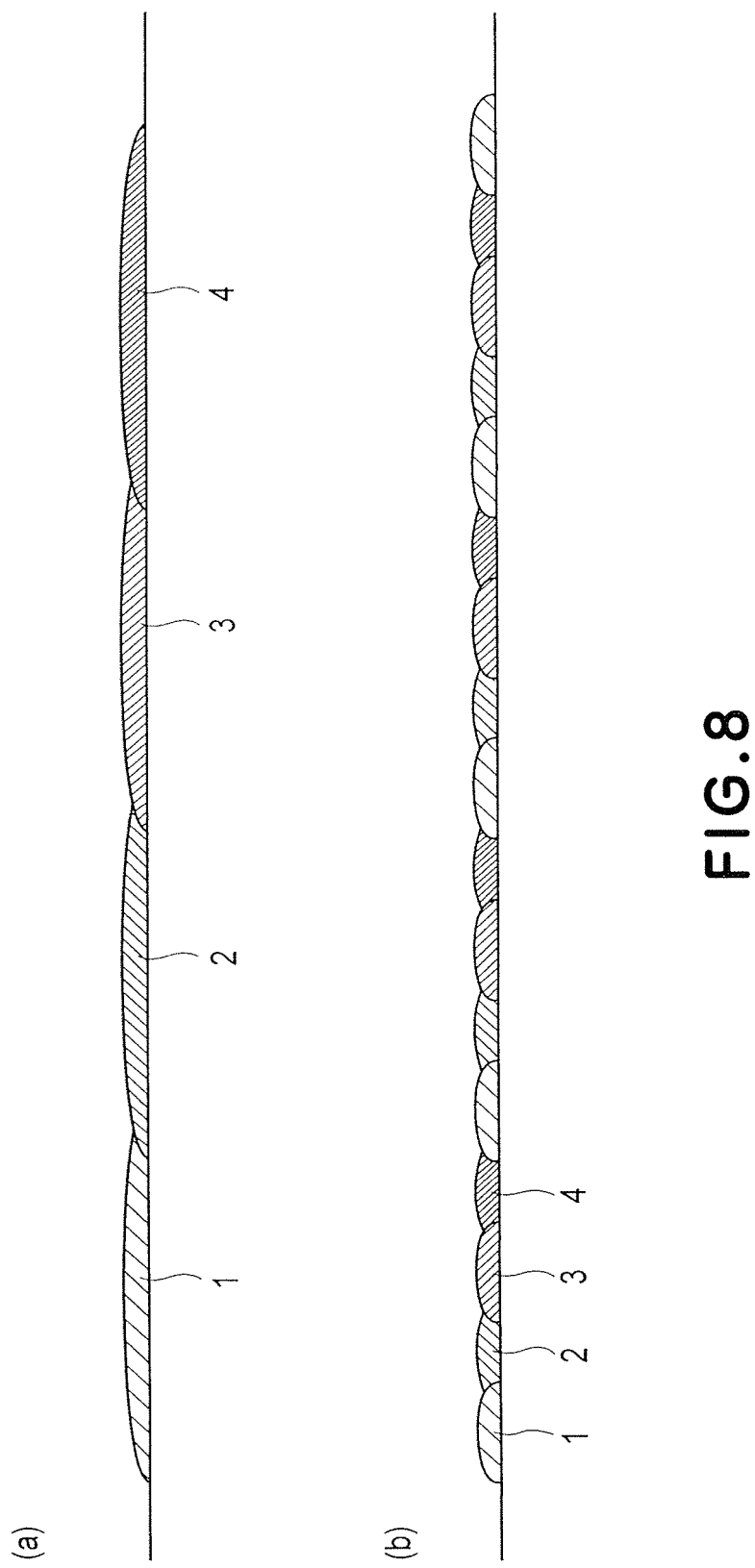
FIGS. 8(*a*) and 8(*b*) are sectional views of the plurality of ink dots having been deposited on recording medium, showing how the ink dots accumulate on the surface of the recording medium.

FIG. 8 is a schematic sectional view of a printed section of recording medium, showing how ink droplets are deposited in layers on recording medium as they are deposited with the use of the masks shown in FIGS. 6(*b*) and 6(*c*). FIG. 8(*a*) shows how the ink droplets are deposited in layers on recording medium as an image is recorded by the multi-pass recording method employing the mask shown in FIG. 6(*b*), and FIG. 8(*b*) shows how the ink droplets are deposited in layers on recording medium as an image is recorded by the four-pass recording method employing the mask shown in FIG. 6(*c*) The ink droplets designated by the referential numbers 1-4 in FIG. 8 are the ink droplets deposited during the first-fourth passes as they are in FIG. 1. The ink droplets deposited during the earlier recording scan (pass) make up the ink layer closer to recording medium, although all ink droplets are in contact with the recording medium. As will be evident from the drawings, the difference in mask pattern results in the difference in the flatness of the surface of the recorded area of the recording medium.

In the case of matte paper, there occurs no problem related to the glossiness of the recorded areas of recording medium, making it unnecessary to use a recording method which is specifically designed for the flatness of the recorded area. In this embodiment, therefore, when matte paper is used as recording medium, mask patterns similar to mask patterns in accordance with the prior art, that is, the mask patterns designed for providing a gap between the adjacent two ink dots. On the other hand, in the case that pigment ink is used for recording on glossy paper, there occurs the problem that the recorded and unrecorded areas become different in glossiness. In this embodiment, therefore, a mask pattern such as the one shown in FIG. 6(*b*) is used to yield a copy, the recorded areas of which are as flat as possible.

In the above, the recording method in accordance with the present invention has been described with reference to the mask patterns, in which a unit area of recording per ejection is rendered equivalent in size and shape to 4 picture elements×4 picture elements. However, the mask pattern does not need to be limited in size and shape to the above described ones. The uneven portions of the recorded areas of recording medium (finished copy) coincide with where the two dots different in the order of recording scan (pass) overlap with each other. Employing the recording method in which a unit area of recording per ejection is equivalent in size and shape to 4 picture elements×4 picture elements as in this embodiment is effective to minimize the overlapping of ink droplets, and therefore, it is effective to yield a copy, the recorded areas of which are minimum in terms of the unevenness of surface; in other words, it is effective to yield a copy, the recorded areas of which are as flat as possible. As will be understood from the above explanation, the unit area of recording per ejection does not need to be equivalent in size and shape to 4 picture elements ×4 picture elements. That is, as long as recording is made so that the unit area of recording per ejection is equivalent in size and shape to n (number of picture elements)× m (number of picture elements), that is, as long as a plurality of picture elements, which are equivalent in number and distribution pattern to a unit area of recording per ejection, are recorded in concentration, the effects of this embodiment can be realized. The pattern in which the plurality of picture elements are recorded does not need to be rectangular (or square). It should be noted here that the effect of the multi-pass recording method does not manifest per unit area of recording. However, increasing in size the unit area of recording per ejection raises the possibility that the ill effects of the multi-pass recording method will be conspicuous. The size and shape of the unit area by which recording is made per ejection have only to be set for the best results, according to circumstance, while balancing the level of glossiness against the effects of the multi-pass recording method.

Of course, the number of passes does not need to be limited to four; it may be greater, or smaller, than four. All that is necessary for the effect of the present invention to be realized is to ensure that the multi-pass recording method is carried out using a mask pattern in which a plurality of picture elements, which are equivalent in number and distribution pattern to a unit area of recording per ejection, are formed all at once in concentration.

The mask patterns in this embodiment have long been in use for various purposes. However, the multi-pass recording method, in this embodiment, in which the mask pattern best suited for yielding a copy, the recorded areas of which are as flat as possible, is selectively employed from among a plurality of mask patterns, when recording medium is selected for glossiness, has not been in existence.

As described above, according to the present invention, when an image is recorded on glossy recording medium, a mask pattern, in which a plurality picture elements, which are equivalent in number and distribution pattern to a unit area of recording per ejection, are recorded in concentration, is employed. Therefore, it is possible to form a copy, the recorded areas of which are as little different in glossiness as possible from the unrecorded areas of the copy.

Embodiment 2

Next, the second embodiment of the present invention will be described. The ink jet recording apparatus in this embodiment is the same as that in the first embodiment described with reference to FIGS. 2 and 3. In this embodiment, however, when recording on glossy paper, a given unit area of recording is completed by a single pass (recording scan), instead of multiple passes.

As has already been described, a multi-pass recording method has the effect of yielding an excellent image even when ink and/or recording medium slow in ink absorbency speed is used, in addition to the effect of diffusing various noises. However, it has the defect of reducing an ink jet recording apparatus in recording speed.

In recent years, various research has been done to improve special purpose recording medium such as glossy paper in absorption speed. As a result, most of the problems related to the pigment ink fixation time have been solved. Further, clear improvements have also been made regarding the problems attributable to the nonuniformity among recording elements which occurs during recording element manufacture, and the irregularity in recording medium conveyance. Thus, the effects of the multi-pass recording method have become less apparent than they were in the past.

In this kind of circumstance, the loss of glossiness attributable to the employment of the multi-pass recording method is very conspicuous, sometimes overwhelming the benefits brought by the employment of the multi-pass recording method. More concretely, when an image is formed with the combination of pigment ink and multi-pass recording method, the ink droplets ejected during a given recording scan of recording medium land on the dots formed on the recording medium during the preceding recording scans of recording medium, so that the dots formed by the given recording scan will partially overlap with the dots on the recording medium, and continue to dry. Thus, a given recorded area of recording medium has a plurality of ink layers formed through a plurality of recording scans (passes), one for one, as shown in FIG. 8(b). In other words, the surface of the recorded portion of recording medium is more uneven, being therefore less glossy than the surface of the unrecorded portion of recording medium. In comparison, when an image is formed by the single-pass recording method, the recorded portion of recording medium is covered with only a single layer of ink, being therefore less uneven, being therefore more glossy, than the portion of recording medium recorded by the multi-pass recording method. In other words, the multi-pass recording method is greater in the unevenness of the surface of the recorded area or recording medium, being therefore inferior in glossiness, than the single-pass recording method.

In this embodiment, therefore, when glossy paper is selected as recording medium, an image is formed by the single-pass recording method (multi-pass recording method is not employed). With the employment of the single-pass recording method, that is, without the employment of the multi-pass recording method, the entire image data are reflected on an image being formed during a single recording scan of recording medium. Therefore, ink droplets are sequentially ejected onto recording medium, covering therefore the recording medium in an orderly manner. Therefore, an image, which is smoother across the recorded portions than an image formed by the multi-pass recording method, can be formed.

Presented next are the results of the studies made by the inventors of the present invention in order to confirm the effects of this embodiment. In the following description of these studies, "parts" and "%" are based on weight unless specifically noted.

First, black pigment ink containing pigment and anionic compounds was obtained.

(Pigment Ink K1)

Production of Pigment Dispersing Solution

Copolymer of styrene, acrylic acid, and ethyl acrylate (240 in acid value, 5,000 in weight average molecular weight): 1.5 parts Monoethanol amine: 1.0 part
Di-ethylene glycol: 5.0 parts
Ion exchange water: 81.5 parts The above listed ingredients are mixed, and heated to 70° C. by a water bath to completely dissolve the resinous ingredients. To this solution, 10 parts of newly test produced carbon black (MCF88: product of Mitsubishi Kasei Corp) and 1 part of isopropyl alcohol were added, and the mixture was stirred for 30 minutes. Then, the mixture was subjected to the dispersing process described below.

Dispersing apparatus: Sand grinder (Igarashi Kikai (machineries) Co., Ltd.)
Pulverization medium: zirconium beads (1 mm in diameter)
Pulverization medium fill factor: 50% in volume
Pulverization time: 3 hours After the dispersing process, the mixture was subjected to the centrifugal (12,000 rpm) separating process for 20 minutes to remove coarse particles, yielding thereby the solution containing pigment in the dispersed state.

Production of Pigment Ink K1

To the above described solution, the following ingredients are added in the following ratio, yielding thereby pigment ink, or ink, the primary coloring agent of which is pigment.

Above described solution: 30.0 parts
Glycerin: 10.0 parts
Ethylene glycol: 5.0 parts
N-methyl-pyrrolidone: 5.0 parts
Ethyl alcohol: 2.0 parts
Acetylenol EH (Kawaken Fine Chemical Co., Ltd.): 1.0 part
Ion exchange water: 47.0 parts Next, the color ink container compatible with an ink jet recording apparatus (PIXUS-850i: product of Canon) is filled up with the thus obtained pigment ink K1, and was attached to a recording head compatible with the abovementioned ink jet recording apparatus.

As the recording medium, professional photographic paper (PR-101: product of Canon) was used as recording medium capable of yielding a glossy image of high quality. The recorded images were so-called solid images, more specifically, 2 cm×2 cm patches, all the picture elements of which were given one black ink dot.

The images were recorded using the following four recording methods: single-pass recording method, that is, non-multi-pass recording method; two-pass recording method using the mask shown in FIG. 6(a); four-pass recording method using the mask shown in FIG. 6(c); eight-pass recording method using eight masks obtained by thinning each of the four masks shown in FIG. 6(c) by a factor of two.

The patches recorded using the above described methods were measured in glossiness, using a gloss meter IG-330 (product of Horiba Seisakusho (manufacturer) Co., Ltd.), in 20 degree mode. The patches recorded by the single-pass, two-pass, four-pass, and eight-pass recording methods had glossiness levels of 138, 97, 63, and 50, respectively, proving that an ink jet recording apparatus can be controlled in the flatness and glossiness of the recorded areas of recording medium, by selecting the mask pattern, and/or adjusting the number of times a given unit area of recording medium is scanned for image formation, by a recording head.

As will be evident from the above description of this embodiment, by designing an ink jet recording apparatus so that when recording on glossy paper, the single-pass recording method is used, instead of the multi-pass recording method, it is possible to form an image on glossy paper, so the recorded areas of the glossy paper will be minimum in the loss of glossiness compared to the unrecorded areas of glossy paper.

Embodiment 3

Next, the third embodiment of the present invention will be described. The ink jet recording apparatus in the second embodiment was structured so that when glossy paper was used as recording medium, an image was always formed by the single-pass recording method. However, it is not always true that the flatness level which can be achieved by the single-pass recording method when glossy paper is used as recording medium is the optimal flatness level regardless of the type of glossy paper. In other words, there are circumstances in which recording methods other than the single-pass recording method can yield an image which is less unnatural in terms of glossiness than an image yielded by the single-pass recording method. In consideration of these circumstances, the ink jet recording apparatus in this embodiment is structured so that the optimal recording method is automatically selected according to recording medium type.

The ink jet recording apparatus in this embodiment is similar to those employed in the preceding embodiments, except that the apparatus in this embodiment is provided with a glossiness measuring circuit (Photo-reflector KR640 (product of Shinko Electronics Co., Ltd.) as a glossiness level sensor, which is attached to the recording medium feeding portion of the apparatus. In the block diagram in FIG. 3, the gloss sensor is a part of the sensor/SW portion 407. The gloss sensor measures the glossiness level of recording medium each time the recording medium feeding operation is carried out. Then, the information related to the glossiness level measured as described above is transmitted to the CPU 402. Based on the transmitted information, the CPU selects the recording method and mask patterns optimal for the fed recording medium, and then, instructs the image forming apparatus to record an image with the use of the selected recording method and mask patterns.

Returning to the preceding description of the second embodiment, when professional photographic paper (PR-101) was used as recording medium, the glossiness realized by the two-pass recording method was optimal. In this embodiment, therefore, at the point in time when professional paper (PR-101) is fed, the abovementioned sensor measures the glossiness level of the paper, and transmits the information related to the measured glossiness level of the paper to the CPU 402. Then, the CPU 402 reads the mask for the two-pass recording method from the memory 403, based on the information received from the sensor, and instructs the image forming portion to form an image with the use of the two-pass recording method. As a result, a copy which shows virtually no difference in glossiness between the recorded and unrecorded areas, that is, a copy which is natural in appearance, is yielded. Also when recording media other than glossy paper are used, the recording method is selected through the process similar to the above described one so that an image is formed by a recording method capable of yielding an image optimal in glossiness.

As described above, according to this embodiment, an ink jet recording apparatus is provided with a means for measuring the glossiness level of recording medium, which is equivalent to the glossiness level of the unrecorded areas of a finished copy. Further, the apparatus is designed so that it selects the optimal mask pattern and the optimal number of passes, based on the results of the measurement. Therefore, it is possible to always yield copies natural in glossiness even if a plurality of recording media different in glossiness level are fed into the ink jet recording apparatus in the random order.

Incidentally, in this embodiment, a Photo-Reflector KR640 (product of Shinko Electronic Co., Ltd.) was employed as the gloss sensor. The employment of this sensor, however, is not intended to limit the scope of the present invention. In other words, any gloss sensor may be employed as long as it is based on one of the ordinary optical methods. For example, Photo-Reflectors KR641, KR650, and KR651 (products of Shinko Electronics Co., Ltd.), or a combination of a light emitting diode and a photo-diode, may be employed.

As for the glossiness levels of the recorded and unrecorded areas of a copy, there may be a certain amount of difference between the glossiness levels perceived by the human eye and those obtained by a gloss sensor. In consideration of this fact, an ink jet recording apparatus may be provided with a means for making adjustments based on the results obtained by the sensor.

In the preceding three embodiments, the recording method was controlled to yield a copy, the recorded and unrecorded areas of which appear as close as possible in glossiness to each other. However, it can be controlled to deliberately yield a copy, the recorded and unrecorded areas of which appear different in glossiness. Thus, an ink jet recording apparatus may be designed so that the glossiness level can be set by a user according to the existing conditions, the taste of the user regarding glossiness, the type of usage, etc. In any case, the present invention is effective as long as an ink jet recording apparatus is designed so that the level, at which the glossiness of the surface of the recording medium used for image formation will be after the formation of an image on the recording medium, can be controlled by selecting a recording method.

Also in the preceding embodiments, the recording heads were structured as shown in FIG. 4 so that recording is made by ejecting liquid droplets with the use of thermal energy. As for the recording head structure and ink ejection principle, those disclosed in the specifications of U.S. Pat. Nos. 4,723,129, and 4,740,796 are preferable.

The recording method in accordance with the present invention is compatible to both an ink jet recording apparatus of the so-called on-demand type, and an ink jet recording apparatus of the so-called continuous type. It is particularly effective when applied to an ink jet recording apparatus of the on-demand type for the following reason. That is, in the case of an ink jet recording of the on-demand type, a plurality of electro-thermal transducers are disposed on the sheets, or in liquid passages, one for one, in which liquid (ink) is held. To each of these electro-thermal transducers, a minimum of one driving signal, which reflects recording data and is capable of virtually instantly raising the temperature of the ink to a level at which the ink will boil in the so-called film boiling fashion, is applied, causing thereby the ink to boil in the film-boiling fashion at the interface between the ink and electro-thermal transducer. Therefore, bubbles are formed in the liquid (ink) by the driving signals one for one. This is why the present invention is particularly effective when applied to an ink jet recording apparatus of the on-demand type. Also regarding an ink jet recording apparatus of the on-demand type, as the bubble grows and contracts, the liquid (ink) is ejected through a liquid ejection orifice, forming at least one liquid (ink) droplet. As for the waveform of the driving signal, if the driving signal is in the form of a pulse, the driving signal causes the bubble to virtually instantly grow and contract, causing thereby the liquid (ink) to be virtually instantly ejected in response to the driving signal. Therefore, it is preferred that the driving signal is in the form of a pulse.

Regarding the driving signal in the form of a pulse, those disclosed in the specifications of U.S. Pat. Nos. 4,463,359, and 4,345,262 are suitable. Further, the employment of the conditions disclosed in the specifications of U.S. Pat. No. 4,313,124 related to the invention regarding the rate of temperature increase at the aforementioned heat transfer interface further improves an ink jet recording apparatus in recording performance.

As for the recording head structure compatible with the present invention, in addition to the recording head structures, in which the ejection orifices, liquid passages, and electro-thermal transducers are disposed as disclosed in the specifications of each of the above described patents, the recording head structure in which the heat transfer interface is disposed in the bend portion of the liquid passage, as disclosed in U.S. Pat. Nos. 4,558,333, and 4,459,600, can also be employed as one of the preferable recording head structures.

Further, the present invention is also compatible with the recording head structure, disclosed in Japanese Laid-open Patent Application 59-123670, in which each slit is shared as a liquid ejection orifice by a plurality of electrothermal transducers, the recording head structure, disclosed in Japanese Laid-open Patent Application 59-138461, in which each liquid ejecting portion is provided with an opening for absorbing the pressure waves generated by thermal energy.

Moreover, not only is the present invention compatible with a recording head which uses thermal energy, but also a recording head employing piezoelectric elements.

While the invention has been described with reference to the structures disclosed herein, it is not confined to the details set forth, and this application is intended to cover such modifications or changes as may come within the purposes of the improvements or the scope of the following claims.

This application claims priority from Japanese Patent Application No. 112213/2004, filed Apr. 6, 2004, which is hereby incorporated by reference.

What is claimed is:

1. An ink jet recording apparatus for recording an image on a recording material using a recording head for ejecting ink including pigment, comprising:

executing means for executing a first recording mode for recording an image on an area of a first recording material through a plurality of recording scans by the recording head using a first mask pattern for determining an arrangement of recordable pixels which are recordable in each of the recording scans, and a second recording mode for recording an image on an area of a second recording material through a plurality of recording scans by the recording head using a second mask pattern for determining an arrangement of recordable pixels which are recordable in each of the recording scans in the second recording mode, wherein a number of the recording scans for the area in the first recording mode is the same as a number of the recording scans for the area in the second recording mode, wherein the first recording material is glossy paper and the second recording material is matte paper, and wherein the first mask pattern determines the arrangement so that adjacent pixels are recordable in the same recording scan and the second mask pattern determines the arrangement so that adjacent pixels are not recorded in the same recording scan.

2. An ink jet recording apparatus according to claim 1, further comprising:

obtaining means for obtaining information indicative of a kind of the recording material to be used from a plurality of kinds of recording materials including the first recording material and the second recording material, wherein the executing means executes one recording mode selected, based on the information obtained by the obtaining means, from a plurality of recording modes including the first and second recording modes.

3. An ink jet recording apparatus for recording an image on a recording material using a recording head for ejecting ink including pigment, comprising:

executing means for executing a first recording mode for recording an image on an area of a first recording material through a plurality of recording scans by the recording head using a first mask pattern for determining an arrangement of recordable pixels which are recordable in each of the recording scans, and a second recording mode for recording an image on an area of a second recording material through a plurality of recording scans by the recording head using a second mask pattern for determining an arrangement of recordable pixels which are recordable in each of the recording scans in the second recording mode, wherein a number of recording scans for the area in the first recording mode is the same as a number of the recording scans for the area in the second recording mode, wherein the first recording material is a glossy recording material and the second recording material is a predetermined type of recording material different from the glossy recording material, and wherein the first mask pattern determines the arrangement so that adjacent pixels are recordable in the same recording scan and the second mask pattern determines the arrangement so that adjacent pixels are not recorded in the same recording scan.

4. An ink jet recording method for recording an image on a recording material using a recording head for ejecting ink including pigment, comprising the steps of:

selecting one recording mode to be executed from a plurality of recording modes including a first recording mode for recording an image on an area of a first recording material through a plurality of recording scans using a first mask pattern for determining an arrangement of recordable pixels which are recordable in each of the recording scans, and a second recording mode for recording an image on an area of a second recording material through a plurality of recording scans by the recording head using a second mask pattern for determining an arrangement of recordable pixels which are recordable in each of the recording scans in the second recording mode; and executing the one recording mode selected in the selecting step, wherein a number of the recording scans for the area in the first recording mode is the same as a number of the recording scans for the area in the second recording mode, wherein the first recording material is glossy paper and the second recording material is matte paper, and wherein the first mask pattern determines the arrangement so that adjacent pixels are recordable in the same recording scan and the second mask pattern determines the arrangement so that adjacent pixels are not recorded in the same recording scan.

5. An ink jet recording method according to claim 4, further comprising the step of:

obtaining information indicative of a kind of the recording material to be used from a plurality of kinds of recording materials including the first recording material and the second recording material, wherein, in the selecting step, the one recording mode to be executed is selected, based on the information obtained in the obtaining step, from the recording modes.

6. An ink jet recording method for recording an image on a recording material using a recording head for ejecting ink including pigment, comprising the steps of:

selecting one recording mode to be executed from a plurality of recording modes including a first recording mode for recording an image on an area of a first recording material through a plurality of recording scans by the recording head using a first mask pattern for determining an arrangement of recordable pixels which are recordable in each of the recording scans, and a second recording mode for recording an image on an area of a second recording material through a plurality of recording scans by the recording head using a second mask pattern for determining an arrangement of recordable pixels which are recordable in each of the recording scans in the second recording mode; and executing the one recording mode selected in the selecting step, wherein a number of the recording scans for the area in the first recording mode is the same as a number of the recording scans the area in the second recording mode, wherein the first recording material is a glossy recording material and the second recording material is a predetermined type of recording material different from the glossy recording material, and wherein the first mask pattern determines the arrangement so that adjacent pixels are recordable in the same recording scan and the second mask pattern determines the arrangement so that adjacent pixels are not recorded in the same recording scan.

* * * * *